(12) United States Patent
Navon et al.

(10) Patent No.: US 11,023,138 B2
(45) Date of Patent: Jun. 1, 2021

(54) MANAGEMENT OPERATIONS IN PREDICTABLE LATENCY MODE

(71) Applicant: Western Digital Technologies, Inc., San Jose, CA (US)

(72) Inventors: Ariel Navon, San Jose, CA (US); Shay Benisty, San Jose, CA (US); Alexander Bazarsky, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 147 days.

(21) Appl. No.: 16/456,564

(22) Filed: Jun. 28, 2019

(65) Prior Publication Data

US 2020/0409562 A1    Dec. 31, 2020

(51) Int. Cl.
*G06F 3/06* (2006.01)
*G06F 12/02* (2006.01)

(52) U.S. Cl.
CPC ............ *G06F 3/0611* (2013.01); *G06F 3/064* (2013.01); *G06F 3/0679* (2013.01); *G06F 12/0253* (2013.01)

(58) Field of Classification Search
CPC .... G06F 12/0253; G06F 3/0611; G06F 3/064; G06F 3/0679
See application file for complete search history.

(56) References Cited

U.S. PATENT DOCUMENTS

| 2016/0133334 | A1* | 5/2016 | Zhang | G11C 16/3427 365/185.02 |
| 2017/0357529 | A1* | 12/2017 | Venkatraman | H04L 67/22 |
| 2019/0042150 | A1* | 2/2019 | Wells | G06F 3/0679 |
| 2020/0004674 | A1* | 1/2020 | Williams | G06F 9/4887 |

\* cited by examiner

*Primary Examiner* — Jane Wei
(74) *Attorney, Agent, or Firm* — Dickinson Wright PLLC; Steven Hurles

(57) ABSTRACT

A non-volatile storage system, configured to use a protocol that supports predictable latency, including: a memory array storing a data in a block of memory; a controller coupled to the memory array, where the controller is configured to: in response to determining that predictable latency is enabled, operate the storage system using a first mode for a duration of time, where during the first mode, the storage system operates such that a read latency is below a read latency threshold; and after the duration of time, operate, the storage system using a second mode for a second duration of time, where during the second mode: the storage system performs a management operation based on a second set of thresholds that are different from a first set of threshold used during the first mode.

17 Claims, 7 Drawing Sheets

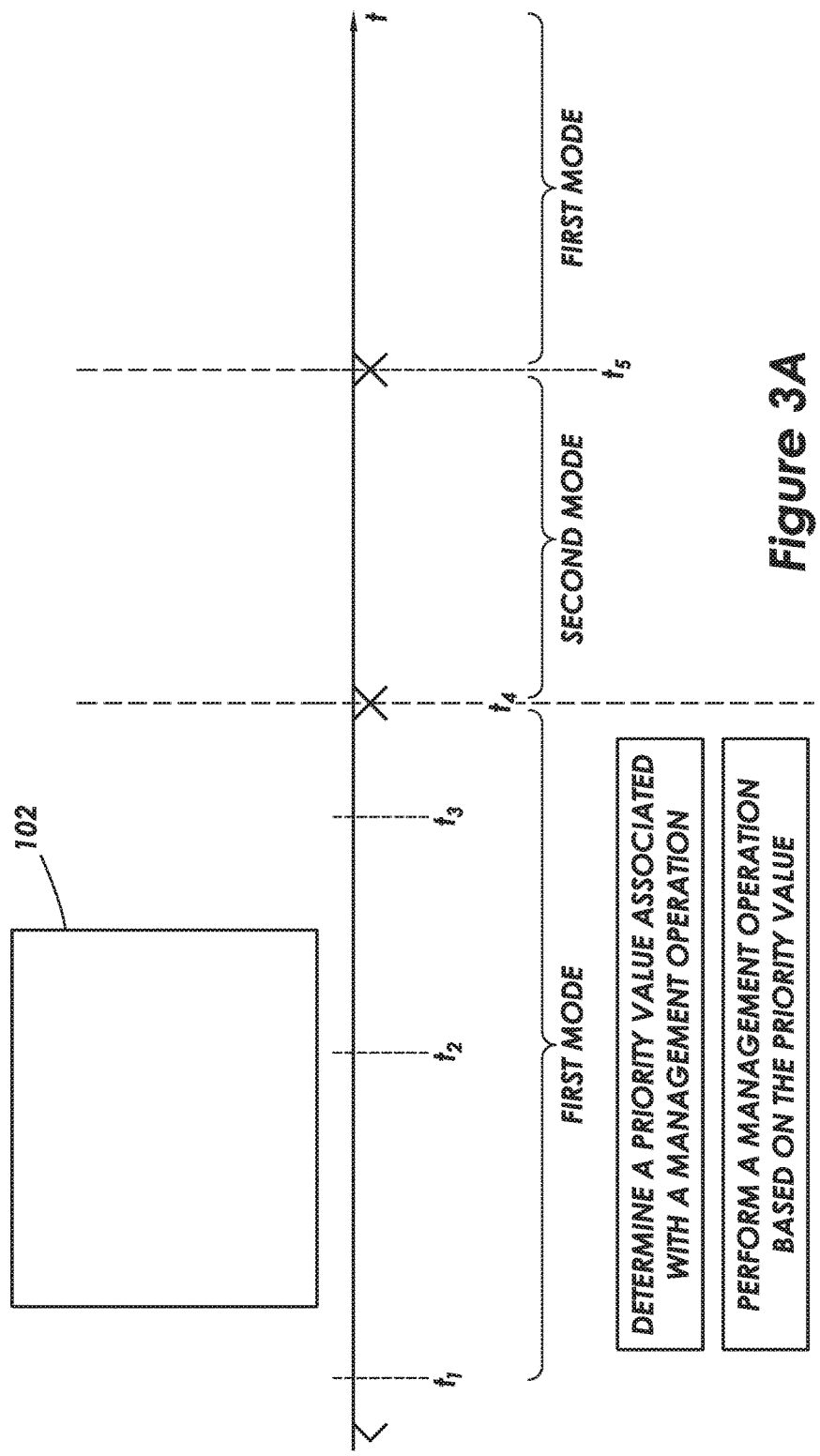

MANAGEMENT OPERATIONS IN PREDICTABLE LATENCY MODE

BACKGROUND

Non-volatile memory systems retain stored information without requiring an external power source. One type of non-volatile memory that is used ubiquitously throughout various computing devices and in stand-alone memory devices is flash memory. For example, flash memory can be found in a laptop, a digital audio player, a digital camera, a smart phone, a video game, a scientific instrument, an industrial robot, medical electronics, a solid state drive, and a USB drive.

Various interfaces can be used to access non-volatile storage media. One example interface applicable to storage media attached via a PCI Express (PCIe) bus includes NVM Express (NVMe) or Non-Volatile Memory Host Controller Interface Specification (NVMHCIS). Specifically, the NVMe is a host controller interface and storage protocol created to accelerate the transfer of data between enterprise and client systems and solid-state drives (SSD) or other flash based hard drives. The NVMe protocol supports a feature called predictable latency that enables a particular storage media to operate within certain quality of service (QOS) specifications.

SUMMARY

Various embodiments include a non-volatile storage system, configured to use a protocol that supports predictable latency, including: a memory array storing a data in a block of memory; and a controller coupled to the memory array. The controller is configured to: in response to determining that predictable latency is enabled, operate the storage system using a first mode for a duration of time, where during the first mode, the storage system operates such that a read latency is below a read latency threshold. After the duration of time, the controller is further configured to operate the storage system using a second mode for a second duration of time, where during the second mode: the storage system performs a management operation based on a second set of thresholds that are different from a first set of thresholds used during the first mode.

Other embodiments include a method for operating a memory system using a protocol that supports predictable latency, including: in response to determining that predictable latency is enabled, operating the memory system using a first mode for a duration of time, where during the first mode, the memory system operates such that a read latency is below a read latency threshold. After the duration of time, the method further includes operating the memory system using a second mode for a second duration of time, where during the second mode: the memory system performs a management operation based on a priority value associated with the management operation.

Additional embodiments include a memory controller, including: a first terminal configure to couple to a memory array. The memory controller is configured to: in response to determining that predictable latency is enabled, operate the memory array using a first mode for a duration of time, where during the first mode, the memory array operates such that a read latency is below a read latency threshold. After the duration of time, the memory controller is additionally configured to operate the memory array using a second mode for a second duration of time, where during the second mode, the controller performs a management operation based on a priority value associated with the management operation.

BRIEF DESCRIPTION OF THE DRAWINGS

For a detailed description of example embodiments, reference will now be made to the accompanying drawings in which:

FIG. 3A illustrates a conceptual and method of operating a memory system, in accordance with some embodiments.

DETAILED DESCRIPTION

Figure 1:
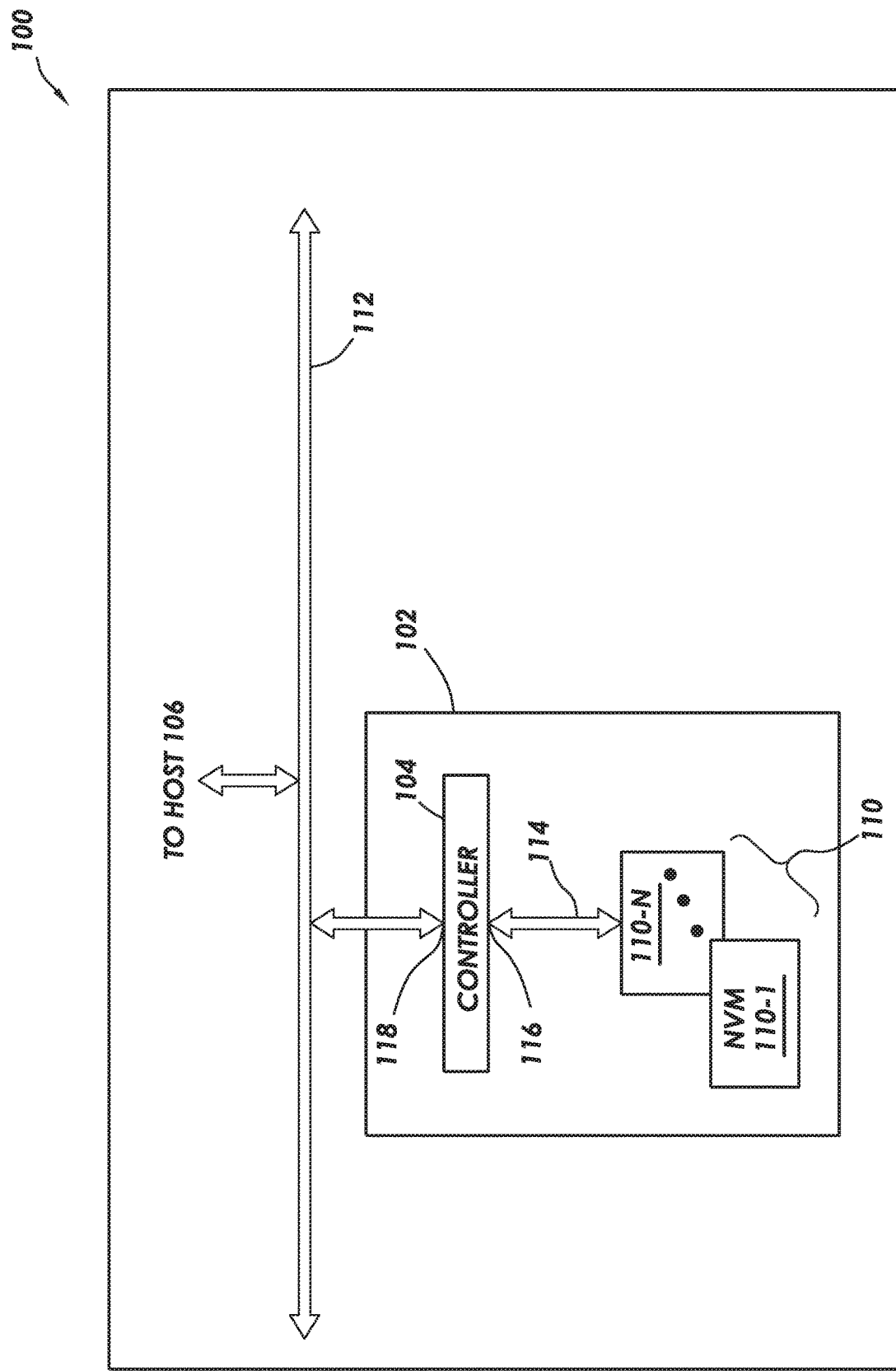
FIG. 1 illustrates a block diagram of an example non-volatile memory system, in accordance with some embodiments.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections. References to a controller shall mean individual circuit components, an application-specific integrated circuit (ASIC), a microcontroller with controlling software, a digital signal processor (DSP), a processor with controlling software, a field programmable gate array (FPGA), or combinations thereof.

At least some of the example embodiments are directed to performing management operations in a system where predictable latency is enabled and in a manner that accounts for whether a system is operating in a deterministic window or a non-deterministic window. For example, a management operation is performed more aggressively during the non-deterministic window.

Additional embodiments are directed to assigning a priority value that is associated with a management operation, during the deterministic window. By partially performing management operations during the deterministic window, partial management operations may be performed during the deterministic window. By shifting some of the management operations to the deterministic window, additional bandwidth is available to perform additional management operations during the non-deterministic window.

By implementing the methods and techniques described herein, a memory system enters a deterministic window in a more optimized state. Overall, systems that implement the methods and techniques described herein will be able to perform read operations faster, have better performance, and have better timing durations—e.g., faster responses to various commands—and overall have better quality of service (QOS) results.

Techniques described below include a method for operating a memory system using a protocol that supports predictable latency that includes: operating the memory system using a first mode for a duration of time, where during the first mode, the memory system operates such that a read latency is below a read latency threshold. As used herein an example of a first mode is a deterministic window. The method also include operating the memory system using a second mode for a second duration of time, where during the second mode: the memory system performs a management operation based on a priority value associated with the management operation. As used herein an example of a second mode is a non-deterministic window.

FIG. 1 illustrates a block diagram of an example system architecture 100 including non-volatile memory 110. In particular, the example system architecture 100 includes storage system 102 that further includes a controller 104 communicatively coupled to a host 106 by a bus 112. The bus 112 implements any known or after developed communication protocol that enables the storage system 102 and the host 106 to communicate. Some non-limiting examples of a communication protocol include Secure Digital (SD) protocol, Memory Stick (MS) protocol, Universal Serial Bus (USB) protocol, or Advanced Microcontroller Bus Architecture (AMBA).

The controller 104 has at least a first port 116 coupled to a non-volatile memory ("NVM") 110, hereinafter "memory 110" by way of a communication interface 114. The memory 110 is disposed within the storage system 102. The controller 114 couples the host 106 by way of a second port 118 and the bus 112. The first and second ports 116 and 118 of the controller can include one or several channels that couple the memory 110 or the host 106, respectively.

The memory 110 of the storage system 102 includes several memory die 110-1-110-N. The manner in which the memory 110 is defined in FIG. 1 is not meant to be limiting. In some embodiments, the memory 110 defines a physical set of memory die, such as the memory die 110-1-110-N. In other embodiments, the memory 110 defines a logical set of memory die, where the memory 110 includes memory die from several physically different sets of memory die. The memory die 110 include non-volatile memory cells that retain data even when there is a disruption in the power supply. Thus, the storage system 102 can be easily transported and the storage system 102 can be used in memory cards and other memory devices that are not always connected to a power supply.

In various embodiments, the memory cells in the memory die 110 are solid-state memory cells (e.g., flash), one-time programmable, few-time programmable, or many time programmable. Additionally, the memory cells in the memory die 110 can include single-level cells (SLC), multiple-level cells (MLC), or triple-level cells (TLC). In some embodiments, the memory cells are fabricated in a planar manner (e.g., 2D NAND (NOT-AND) flash) or in a stacked or layered manner (e.g., 3D NAND flash).

Still referring to FIG. 1, the controller 104 and the memory 110 are communicatively coupled by an interface 114 implemented by several channels (e.g., physical connections) disposed between the controller 104 and the individual memory die 110-1-110-N. The depiction of a single interface 114 is not meant to be limiting as one or more interfaces can be used to communicatively couple the same components. The number of channels over which the interface 114 is established varies based on the capabilities of the controller 104. Additionally, a single channel can be configured to communicatively couple more than one memory die. Thus the first port 116 can couple one or several channels implementing the interface 114. The interface 114 implements any known or after developed communication protocol. In embodiments where the storage system 102 is flash memory, the interface 114 is a flash interface, such as Toggle Mode 200, 400, or 800, or Common Flash Memory Interface (CFI).

In various embodiments, the host 106 includes any device or system that utilizes the storage system 102—e.g., a computing device, a memory card, a flash drive. In some example embodiments, the storage system 102 is embedded within the host 106—e.g., a solid state disk (SSD) drive installed in a laptop computer. In additional embodiments, the system architecture 100 is embedded within the host 106 such that the host 106 and the storage system 102 including the controller 104 are formed on a single integrated circuit chip. In embodiments where the system architecture 100 is implemented within a memory card, the host 106 can include a built-in receptacle or adapters for one or more types of memory cards or flash drives (e.g., a universal serial bus (USB) port, or a memory card slot).

Although, the storage system 102 includes its own memory controller and drivers (e.g., controller 104)—as will be described further below in FIG. 2A—the example described in FIG. 1 is not meant to be limiting. Other embodiments of the storage system 102 include memory-only units that are instead controlled by software executed by a controller on the host 106 (e.g., a processor of a computing device controls—including error handling of— the storage unit 102). Additionally, any method described herein as being performed by the controller 104 can also be performed by the controller of the host 106.

Still referring to FIG. 1, the host 106 includes its own controller (e.g., a processor) configured to execute instructions stored in the storage system 102 and further the host 106 accesses data stored in the storage system 102, referred to herein as "host data". The host data includes data originating from and pertaining to applications executing on the host 106. In one example, the host 106 accesses host data stored in the storage system 102 by providing a logical address to the controller 104 which the controller 104 converts to a physical address. The controller 104 accesses the data or particular storage location associated with the physical address and facilitates transferring data between the storage system 102 and the host 106. In embodiments where the storage system 102 includes flash memory, the controller 104 formats the flash memory to ensure the memory is operating properly, maps out bad flash memory cells, and allocates spare cells to be substituted for future failed cells or used to hold firmware to operate the flash memory controller (e.g., the controller 104). Thus, the controller 104 performs various memory management functions such as wear leveling (e.g., distributing writes to extend the lifetime of the memory blocks), garbage collection (e.g., moving valid pages of data to a new block and erasing the previously used block), and error detection and correction (e.g., read error handling).

Figure 2:
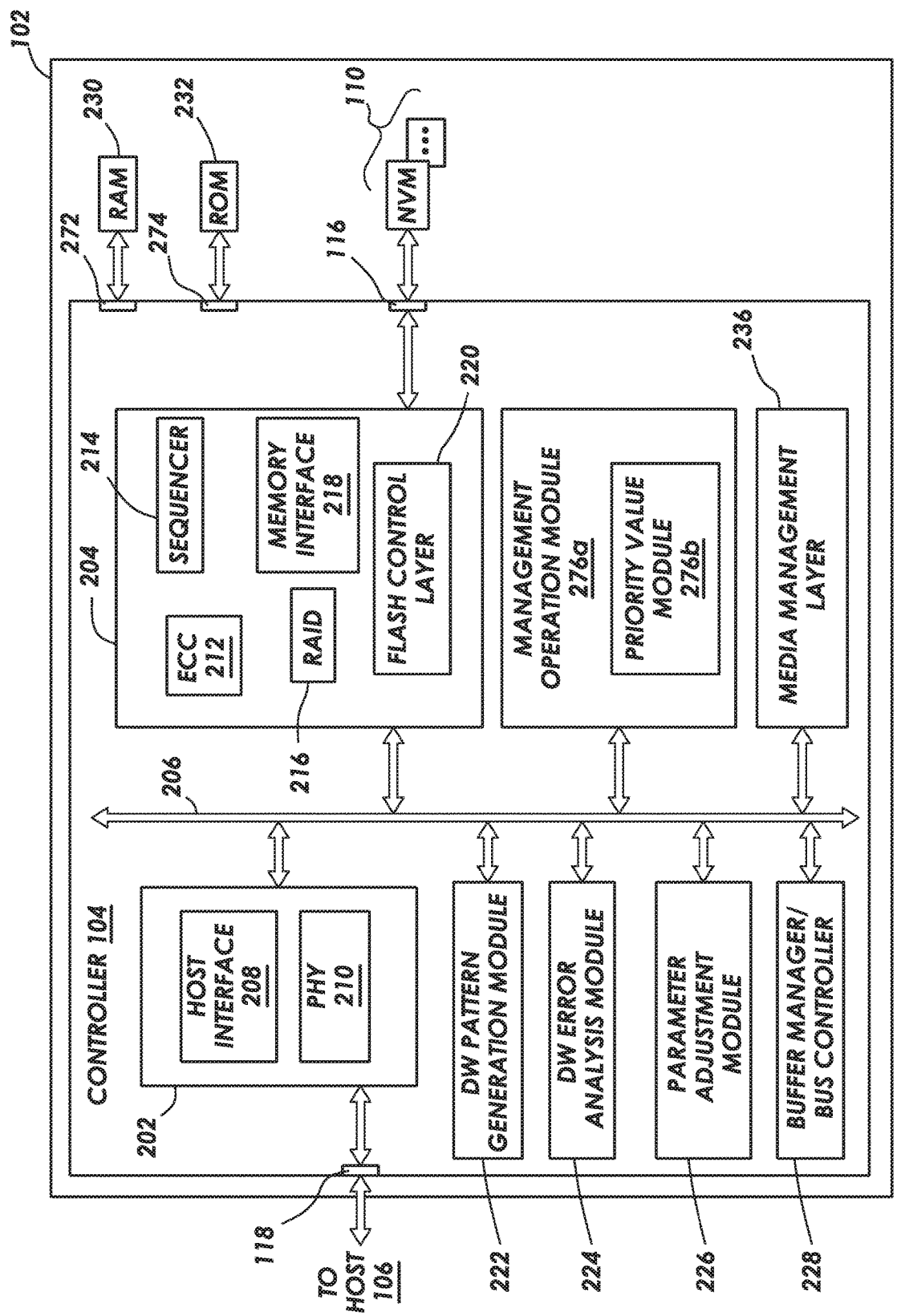
FIG. 2 illustrates a block diagram of example components of a controller, in accordance with some embodiments.

Additional details of the controller 104 and the memory 110 are described next in FIG. 2. Specifically, FIG. 2 shows, in block diagram form, additional details with respect to the controller 104 (introduced in FIG. 1) of the storage system 102. FIG. 2 illustrates previously described controller 104, memory 110 and ports 116 and 118, and additionally a random access memory (RAM) 230 and a read only memory (ROM) 232. The RAM 230 and ROM 232 are respectively coupled to the controller 104 by a RAM port 272 and a ROM port 274.

Although the RAM 230 and the ROM 232 are shown as separate modules within the storage system 102, the illustrated architecture is not meant to be limiting. For example, the RAM 230 and the ROM 232 can be located within the controller 104. In other cases, portions of the RAM 230 or ROM 232, respectively, can be located outside the controller 104. In other embodiments, the controller 104, the RAM 230, and the ROM 232 are located on separate semiconductor die. The discussion now turns to the various example modules included within the controller 104.

The following discussion of the various modules depicted within the controller 104 are meant to be illustrative and not limiting. For example, the various modules described in FIG. 2 are not limited to being executed within the controller 104; one or more modules can be executed outside the controller 104. As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combinations thereof. In other embodiments, a module can include memory that stores instructions executable by a controller to implement a feature of the module. Thus, the controller can be configured with hardware and/or firmware to perform the various functions described herein.

The modules within the controller (e.g., modules 202 and 204) are communicatively coupled to each other by a bus 206. The module 202 interfaces with the host 106 and includes a host interface 208 and a physical layer interface 210 that provides the electrical interface between the host 106 or next level storage controller and the controller 104. The host interface 208 facilitates transfer of data, control signals, and timing signals. Examples of the host interface 208 include SATA, SATA express, Serial Attached SCSI (SAS), Fibre Channel, USB, PCIe, and NVM Express (NVMe). The techniques described herein, in particular, are associated with NVMe, and other protocols that support predictable latency.

Still referring to FIG. 2, the module 204 is configured to communicate with the memory 110, by way of port 116, and includes an error correcting code (ECC) engine 212, a sequencer 214, a Redundant Array of Independent Drives (RAID) module 216, a flash control layer 220, and a memory interface 218. In some embodiments, the ECC engine 212 encodes host data received from the host 106 and stores the encoded host data in the memory 110. When the host data is read out from the memory 110, the ECC engine 212 decodes the host data and corrects errors detected within the host data. In various embodiments, the sequencer 214 generates command sequences, such as program and erase command sequences that are transmitted to the memory 110.

The RAID module 216 generates RAID parity and recovery of failed data. The RAID parity can be used to provide an additional level of integrity protection for data written into the memory 110. In some embodiments, the ECC engine 212 implements the functions of the RAID module 216. The memory interface 218 provides command sequences to the memory 110 and receives status information from the memory 110. For example, the memory interface 218 implements any known or after developed communication protocol including a double data rate (DDR) interface, such as a Toggle Mode 200, 400, or 800. The flash control layer 220 controls the overall operation of the module 204.

Still referring to FIG. 2, additional modules within the controller 104 include a dummy word line (DW) pattern generation module 222, a DW error analysis module 224, and a parameter adjustment module 226. In various embodiments, the DW pattern generation module 222 puts a known data pattern into a dummy word line and tracks or periodically check for errors by reading the data back out of the dummy word line and comparing the data to the known data pattern. In various embodiments, the parameter adjustment module 226 adjusts parameters associated with a particular non-volatile memory die or more specifically a particular memory block.

The example controller 104 includes a buffer manager/bus controller 228 that manages, for example, buffers in the RAM 230 and controls the internal bus arbitration of the bus 206 in the controller 104. Additionally, the example controller 104 includes a media management layer 236 that performs wear leveling of the memory 110. In embodiments where the storage system 102 includes flash memory, the media management layer 236 can be integrated as part of the flash management that handles flash error and interfaces with the host 106. In particular, the media management layer 236 can include an algorithm (e.g., firmware in the memory device), that translates a write command received from the host 106 into a write to the memory 110.

Additional modules also include a management operation module 276a and a priority value module 276b. As described before, the management operation module 276 is configured to detect whether the memory system 102 has predictable latency enabled and furthermore a mode of operation of the memory system 102. In an example where the memory system 102 implements an NVMe protocol, a first mode of operation includes the memory system 102 operating in a deterministic window, while a second mode of operation includes the memory system 102 operating in a non-deterministic window. The modes of operation are described further below.

The management operation module 276 is configured to perform various management operations according to the mode of operation of the memory system 102. For example, during a second mode of operation—during a non-deterministic window—the management operation module 276 is configured to perform management operations with using more aggressive thresholds.

In various embodiments, the management operation module 276 additionally includes a priority value module 276b. As described herein, the example priority value module 276b is configured to assign a priority value to a respective management operation. The management operation module 276 in turn, can perform either a full or partial management operation in the first or second mode of operation.

In one example where a priority value is assigned to a particular management operations, upon completing the particular management operation partially in the first mode, the controller 104 tracks that the management operation has been partially completed and completes performance of the management operation during the second mode. Accordingly, modules and components within an example controller 104 have been described.

As disclosed herein, by implementing the functionality of the management operation module 276, the memory system 102 is able to enter a mode of operation that has high performance demands in an optimized state. That is, by implementing the described methods, the memory system 102 is able to perform read operations faster, have better performance, and have better timing durations—e.g., faster responses to various commands—and overall have better quality of service (QOS) results.

Figure 3B:
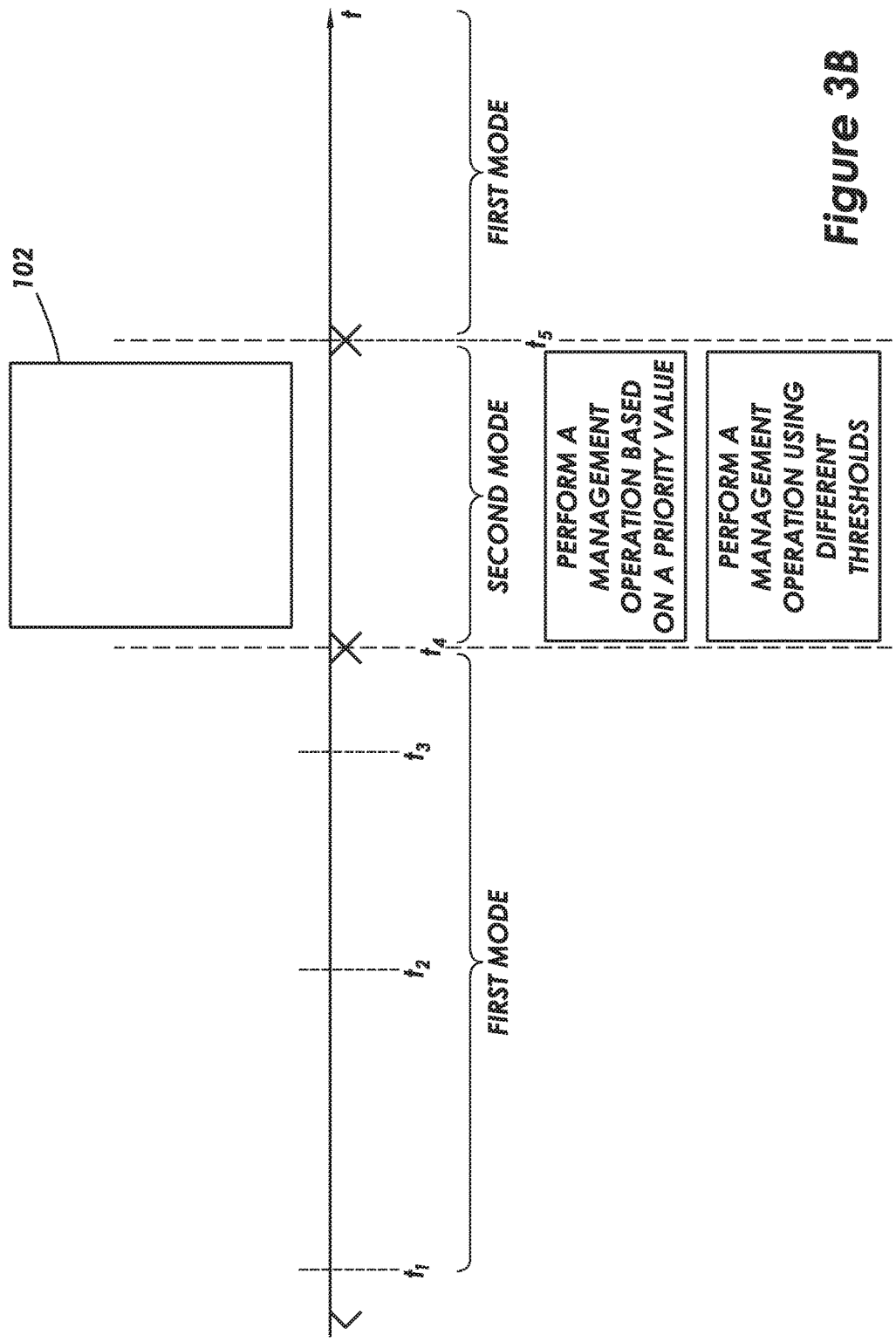
FIG. 3B illustrates a conceptual and method of operating a memory system, in accordance with some embodiments.

FIGS. 3A and 3B describe an example method of operating the memory system 102 that supports predictable latency. As used herein, latency defines an amount of time between when the host 106 sends a read request to the memory system 102 and receives the requested data. When predictable latency is enabled, the memory system 102 operates in a manner that optimizes operation of the memory system 102 such that is meets certain quality of service requirements.

In various embodiments, when predictable latency is enabled, the memory system 102 operates in at least two modes including a first mode and a second mode of operation. In various embodiments, a first mode defines a mode in which an example memory system 102 operates according to the specified quality of service specifications, including the memory system operating such that a read latency is below a read latency threshold. As is known, quality of service specifications can be vendor specific, where the vendor defines certain performance requirements of the memory system 102.

As described herein, various embodiments can implement partial management operations during the first mode, where remaining aspects of the management operation are performed during a subsequent second mode. Additional embodiments perform management operations differently based on whether the memory system is operating in the first or second mode. Specifically, in this embodiment, the management operations are performed using different thresholds between the first and second modes of operation.

As shown in FIG. 3A, a conceptual and method diagram illustrates a method of operating the memory system in accordance with some embodiments. The memory system 102 operates in an example first mode from time t1 to t4. In some embodiments, the first mode defines a deterministic window. During the first mode, a controller refrains from performing management operations that include background and repair tasks and instead prioritizes tasks such as reading and writing in a manner that meets the quality of service specifications. The controller performs background tasks during the second mode, when the memory system 102 is not constrained to performing according to the specified quality of service specifications.

As used herein, example management operations include read scrub operations, calibration of read thresholds, and garbage collection operations. The management operations described are examples and not meant to be limiting to the types of operations that can fall within the definition of management operations. That is, other operations can fall within the scope of management operations without departing from the scope of this disclosure.

In accordance with one embodiment, while the memory system operates in the first mode, a controller assigns a priority level to a management operation. In one example, the priority value module 276b determines a priority value associated with a particular management operation. The management operation is subsequently performed partially or fully based on the associated priority value module 276b. That is, the methods described herein implement a grading system used to determine how much of a management operation to perform during the first mode.

Conventionally, management operations are delayed to the second mode to the extent possible. However, in some instances management operations are performed during the first mode to recover data. The ability to partially perform management operations—as described herein—provides an option that uses fewer resources to perform a management operation. By allowing the memory system 102 to perform partial management operations during the first mode, the resources that would otherwise be used can be used by the memory system 102 to meet the quality of service specifications.

By way of example, a priority value can be determined based on a severity level of the management operation and time remaining in the first mode. In an example where the management operation that is to be performed is calibration of read thresholds at a particular location in the memory system 102, the priority value module 276b can determine a difference between a distribution of threshold voltages and an expected value for the threshold voltages. The larger the difference, the higher the severity level associated with the location.

The priority value module 276b can additionally calculate time remaining in the first mode. In some examples, the time period of the first mode is a predetermined amount. For example, the time period for the first mode in FIG. 3A is defined between t1 and t4. Accordingly, the priority value module 276b can use the predetermined amount of time to calculate time remaining in the first mode.

In other examples, the memory system 102 can determine when to enter the second mode based on various criteria including number of read/write errors encountered, amount of time the memory system has been operating in the first mode, number of host commands received within a given amount of time, and the like. In these examples, the priority value module 276b can assess the various criteria to assess time remaining in the first mode.

In one example, time remaining having a value of high is associated with more time remaining in the first mode, than a value of low which is associated with less time remaining in the first mode. Using the example in FIG. 3A, time remaining may have a value of high between times t1 and t2. Time remaining may have a value of medium between times t2 and t3, and time remaining may have a value of low between times t3 and t4. Thus, when time remaining is assigned a low value, the memory system 102 is about to enter the second mode.

Time remaining can also be defined in terms of threshold values, where the threshold values are defined by certain amounts of time (e.g., time t1, t2, t3, and t4). For example, if less than 2 microseconds remains in the first mode (time t3), this may be equivalent to a value of low. If greater than 5 milliseconds remain in the first mode, this may be equivalent to a value of high. Of note, the time period of the deterministic window can be in the range of tens of milliseconds. The defined ranges of the time period of the deterministic window is one example and not meant to be limiting. Furthermore, the time period of the deterministic window can be a static value or a dynamic value.

Of note, the examples described herein are not meant to be limiting and as an example, any method of assessing a severity level and time remaining may be used without departing from the scope of this disclosure. Furthermore, additional factor can be used to assess a priority value, and such embodiments fall within the scope of this disclosure. For example, in addition to severity level and time remaining, a power budget can also be assessed. For sake of example, embodiments described herein include assessing severity level and time remaining to determine a priority value.

Thus, the priority value module 276b determines a priority value based in part, on the severity level and the time remaining in the first mode. For example, if the severity level is high—the management operation needs to be performed sooner than later—and the time remaining in the first mode is also high, the priority value module 276b may assign a high priority value to the calibration of read threshold operations. Accordingly, the controller 104 performs a full calibration of read thresholds. If the severity level is low—the management operation can be delayed—and the time remaining in the first mode is also low, the priority value module 276b may assign a low priority value to the calibration of read threshold operations. Accordingly, the controller 104 delays the calibration of read thresholds until the memory system 102 enters the second mode.

For other combinations of the severity level and time remaining (e.g., severity level is medium and time remaining is low, medium, or high), the controller 104 can make different determinations as to whether to perform the management operation during the first mode, and if so, to what degree (e.g., partial, full). Thus, by way of the priority value assigned by the priority value module 276b, the controller 104 determines whether to perform the full management operation, a partial management operation, or delay the management operation during the first mode. As mentioned previously, the examples described herein are not meant to be limiting and for example, any method of determining whether to perform the management operation during the first mode, and to what degree may be used without departing from the scope of this disclosure.

In one example, the priority value associated with the management operation is compared to a threshold value associated with default management. As used herein, the default management includes operating in a manner according to conventional means. That is, if the priority value is above the threshold value associated with default management, the controller 104 performs the full management operation during the first mode. If the priority value associated with the management operation is below the threshold value associated with the default management, then the controller 104 performs a partial management operation during the first mode or delays the management operation until the memory system 102 enters the second mode.

Partial management operations performed during the first mode can vary based on the management operation. In the example where the management operation to be performed is a calibration of read thresholds, the partial management operation may include using an algorithm that performs two to four read operations during the calibration of the read thresholds. Where in this example, in contrast, the full management operation includes performing five to eight read operations during the calibration of the read thresholds. In this example partial management operation, as fewer reads are performed the partial management operation is performed faster than a full management operation and has a lower operation cost.

Accordingly, during the first mode, when performing a partial management operation—in this example, a partial calibration of the read thresholds—the controller uses a first algorithm. As described further below, this first algorithm, that uses fewer read operations, is different from a second algorithm that uses a different number of read to perform a calibration of read thresholds.

As another example of a management operation, the management operation to be performed is garbage collection. In this example, to assess a severity level, the priority value module 276b can assess a number of memory blocks waiting to be optimized. In examples where a priority value is below the threshold value associated with default managements, the controller 104 performs a partial management operation by collecting some of the deleted sections. In other examples, instead of cleaning and gathering all blocks until the memory block is optimized—the case for a full management operation—the controller 104 may partially optimize the memory block.

As another example of a management operation, the management operation to be performed is read scrub operation. In this example, the priority value module 276b can assess a difference between a resulting bit error rate (BER) and a threshold value, where the resulting bit error rate is associated with a location in the memory system 102. The larger the difference, the higher the severity level associated with the location at which the read scrub operation is to be performed. In various embodiments, the controller 104 can perform a partial management operation by using an algorithm with a lower operation cost to perform the read scrub, as opposed to a full management operation that uses a different algorithm with a higher operation cost.

Accordingly, various details of operations performed during the first mode have been described in accordance with FIG. 3A. Specifically, during the first mode, the memory system 102 operates such that a read latency is below a read latency threshold amount or a threshold amount, and in a manner that meets quality of service specifications. During the first mode, management operations generally have a lower priority as the memory system 102 allocates more resources to meeting the quality of service specifications. However, in some embodiments, during the first mode, a controller 104 assesses and determines a priority value associated with a management operations and, based on the priority value, performs a full or partial management operation or delays the management operation.

As shown in FIG. 3B, a conceptual and method diagram illustrates a method of operating the memory system in accordance with some embodiments. In FIG. 3B, the memory system 102 enters the second mode at time t4 in response to various criteria. For example, the memory system 102 enters the second mode after operating in the first mode for some threshold period of time (e.g., operating in the first mode from time t1 to t4). During the second mode, the memory system is not constrained to operating in a manner that meets the quality of service specifications. For example, the memory system is not constrained to operating such that a read latency is below a read latency threshold amount. In some embodiments, during the second mode, the memory system may still operate such that it meets a different read latency threshold. For example, the different read latency threshold may be looser than the read latency threshold applicable during the first mode. Thus, an actual read latency during a second mode may be larger than an actual read latency during a first mode.

In various embodiments, the memory system 102 performs management operations taking into account the second mode. Specifically, the memory system can perform a management operation based on a priority value associated with a particular management operation. Additionally, in some embodiments, the memory system can perform management operations based on thresholds different from those used during the first mode.

In one example, the memory system performs a management operation based on a priority value associated with the management operation. In various embodiments, the management operation module 276a is configured to maintain a table that tracks a management operation, a location of the management operation, and a priority value associated with the management operation. Additionally, the table can include information about what was performed with regards to a management operation—e.g., a full management operation, partial management operation, etc.

As explained with regards to FIG. 3a, the controller 104 determines a priority value during the first mode. In the case where a partial management operation was performed during the first mode, during the second mode the controller 104 is configured to complete the management operation or perform additional tasks such that the management operation is performed to completion.

By way of example, if the controller 104 determines that a calibration of read thresholds at location X has a priority value that is below a threshold associated with default management—then a partial calibration of read thresholds may have been performed at location X during the first mode. Accordingly, during the second mode, the controller 104 may perform a calibration of read thresholds that is more complete—e.g., using a second algorithm that uses five to eight read operations during the calibration.

As another example, if the controller 104 determines that garbage collection operation for a memory block has a priority value that is below a threshold associated with default management—then a partial garbage collection operation may have been performed at location X during the first mode. Accordingly, during the second mode, the controller 104 may perform additional garbage collection operations that more fully and completely optimize the memory block.

By way of an additional example, if the controller 104 determines that a read scrub operation for a memory location has a priority value that is below a threshold associated with default management—then a partial read scrub operation may be been performed at location X during the first mode. Accordingly, during the second mode, the controller 104 may perform a read scrub operation that uses an algorithm with a higher operation cost.

Additionally, during the first mode, various management operations may have been delayed, based on the priority value. Accordingly, upon entering the second mode, the controller 104 can determine which management operations were delayed (e.g., based on a priority value) and perform the delayed management operations during the second mode. In examples where a management operation was delayed during the first mode, the controller 104 performs a full or complete management operation during the second mode.

Additionally, in various embodiments, the memory system 102 performs management operations based on thresholds that are different from those used during the first mode. The use of different thresholds can be prompted based on different criteria including: a mode of operation of the memory system, a priority value assigned to a management operation, or some combination thereof.

That is, the use of different thresholds can be prompted once the memory system 102 enters the second mode and regardless of a priority value assigned to a management task. In other examples, the use of a different threshold is prompted regardless of the mode of operation of the memory and in response to a priority value assigned to a management task. In yet other examples, the use of a different threshold is prompted based on both the mode of operation of the memory system 102 and the priority value associated with a management task. In one specific example, the use of a different threshold is prompted when both conditions are true: the memory system is operating in the second mode, and a priority value is above a threshold associated with default management.

In one example of using different thresholds during the second mode, the controller 104 performs a read scrub using different thresholds. In this example, the controller 104 may use a lower threshold when determining when to perform a read scrub—which results in initiating a read scrub more frequently during the second mode.

Specifically, the thresholds that are different can be associated with a number of times a high BER has occurred and the block is marked suspicious, the definition of a high BER, and a number of times a block is marked suspicious before the block is retired.

By way of example, with regards to a read scrub, during a first mode a block is marked suspicious after a high BER has occurred X number of times. Also during the first mode, after a block is marked suspicious Y number of times, the block is retired. Furthermore, a high BER occurs when a measured BER is above a threshold Z.

In contrast, during the second mode, a block is marked suspicious after a high BER has occurred X−n number of times, where the value of X−n is less than X. Thus during a second mode, a block is marked more frequently as suspicious, than in a first mode. Additionally, to account for a block being marked as suspicious more frequently, during a second mode, a block is retired after being marked suspicious Y+m number of times, where a value of Y+m is greater than a Y. Thus, although in a second mode a block is marked suspicious more frequently, a count of the number of times a block is marked suspicious before being retired, is increased. Furthermore, during a second mode, a definition of a high BER can also be modified. For example a high BER occurs when a measured BER is above a threshold Z-y, where the value of Z-y is less than Z.

Similarly, during a second mode, a threshold value associated with when to perform a garbage collection operation may be reduced. Accordingly, garbage collection operations can occur more frequently during the second mode. Similarly as well, during a second mode, a threshold value associated with when to performed calibrations of read thresholds may also be reduced. Accordingly, read thresholds may be performed more frequently during the second mode. Accordingly, during the second mode, different thresholds may be used during and as part of a determination to perform a management operation.

After the memory system 102 completes a duration of the second mode—e.g., at time t5—in various embodiments the memory system 102 transitions back to operating in the first mode. Accordingly, the various embodiments can implement partial management operations during the first mode, where remaining aspects of the management operation are performed during a subsequent second mode. Additional embodiments perform management operations differently based on whether the memory system is operating in the first of second mode. Specifically, in this embodiment, the management operations are performed using different thresholds between the first and second modes of operation.

Figure 4:
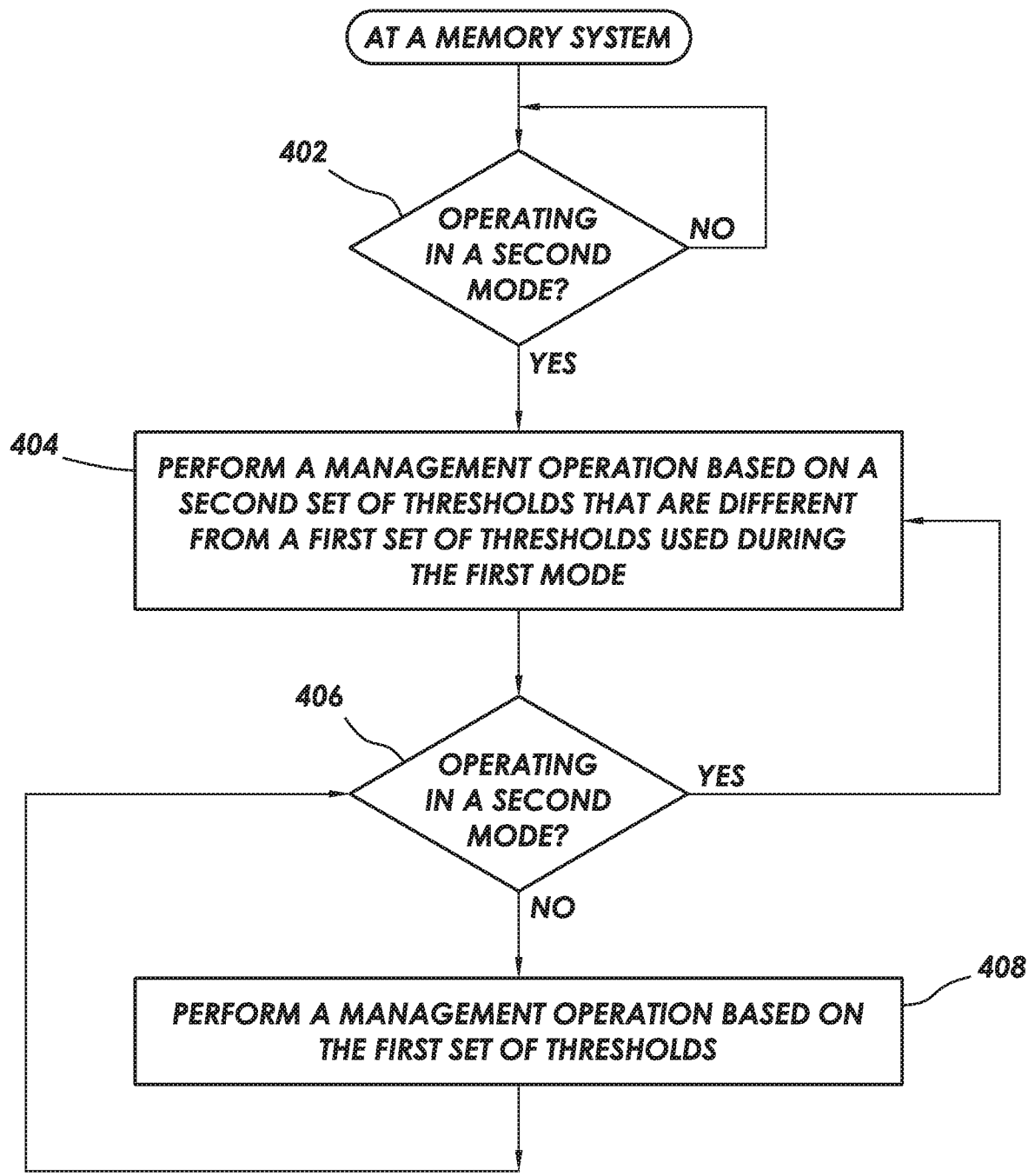
FIG. 4 illustrates a method diagram, in accordance with some embodiments.

FIG. 4 shows a method in accordance with at least some embodiments. In particular, the method is performed at a memory system (e.g., the memory system 102) and includes determining whether the memory system is operating in a second mode (decision block 402). If not operating in the second mode, the memory system continues to check the mode of operation. If yes, the memory system performs a management operation based on a second set of threshold that are different from a first set of threshold used during the first mode (block 404).

Next the memory system determines whether the memory system is still operating in a second mode (decision block 406). As long as the memory system continues to operate in the second mode (answer is no for decision block 406), the memory system continues to perform a management operation based on a second set of thresholds that are different from a first set of thresholds used during the first mode (block 404). If the memory system transitions to the first mode (answer is yes for decision block 406), the memory system performs a management operation based on the first set of thresholds (block 408).

Figure 5:
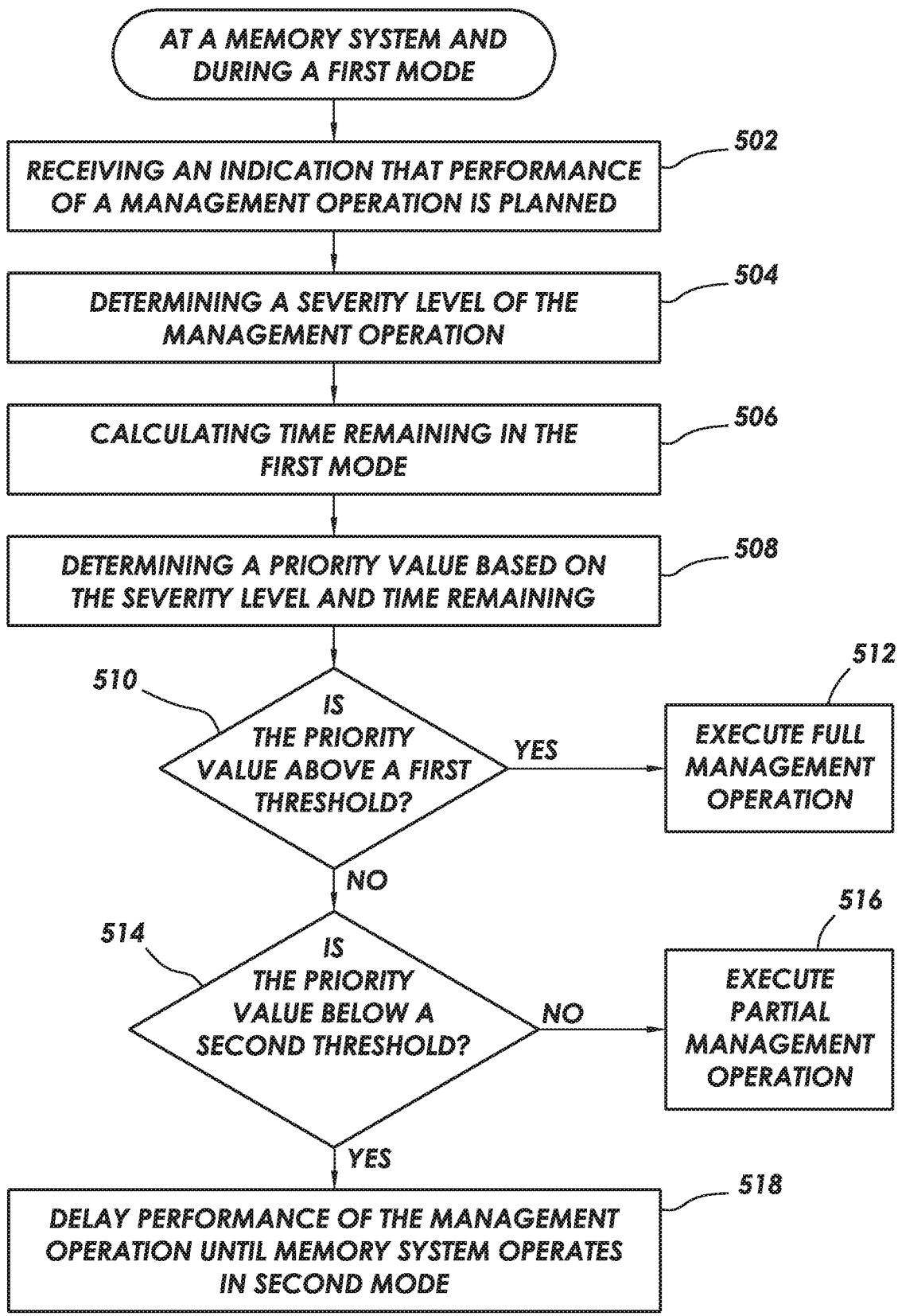
FIG. 5 illustrates a method diagram, in accordance with some embodiments.

FIG. 5 shows a method in accordance with at least some embodiments. In particular, the method is performed at a memory system (e.g., the memory system 102) and during a first mode. In particular, the method includes receiving an indication that performance of a management operation is planned (block 502); determining a severity level of the management operation (block 504); calculating time remaining in the first mode (block 506); and determining a priority value based on the severity level and time remaining (block 508).

The method additionally includes determining if the priority value is above a first threshold (decision block 510). As described herein, the first threshold is a threshold value associated with default management. If the priority value is above the first threshold (answer is yes for decision block 510), the memory system 102 executes the full management operation (block 512). If the priority value is below the first threshold (answer is no for decision block 510), the memory system 102 next determines if the priority value is below a second threshold (decision block 514).

If the priority value is between the first and second threshold (answer is no for decision block 514), the memory system 102 executes a partial management operation (block 516). If the priority value is below the second threshold (answer is yes for decision block 514), the memory system 102 delays performance of the management operation until the memory system operates in the second mode (block 518).

Figure 6:
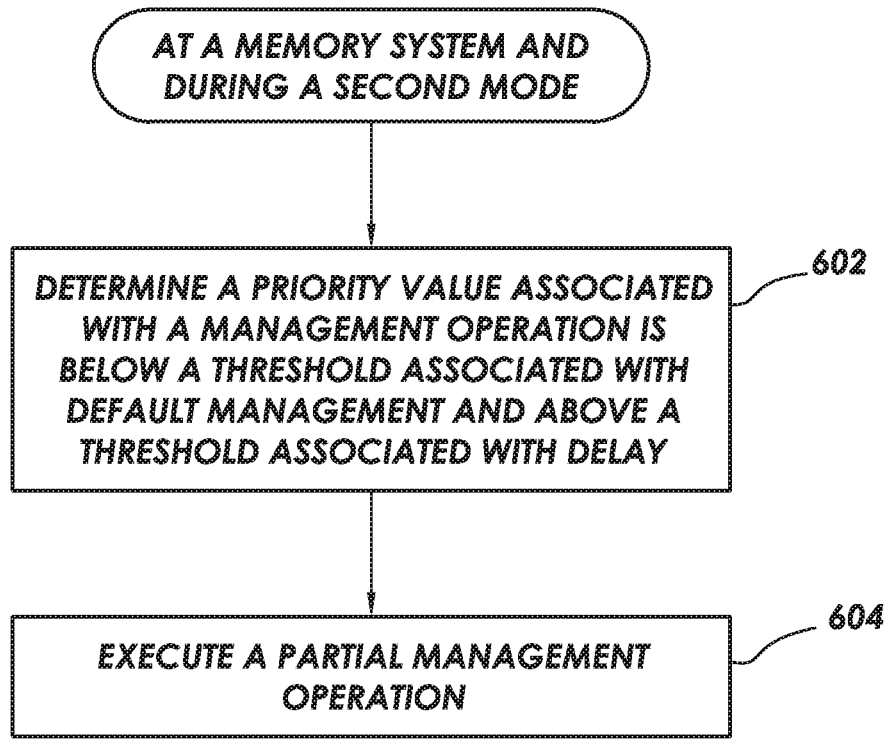
FIG. 6 illustrates a method diagram, in accordance with some embodiments.

FIG. 6 shows a method in accordance with at least some embodiments. In particular, the method is performed at a memory system (e.g., the memory system 102) and during a second mode. In particular, the method includes determining a priority value associated with a management operation is below a threshold associated with default management and above a threshold associated with delay (block 602); and then executing a partial management operation (block 604). Thus, in this example, a priority value can fall within three ranges, above a threshold associated with default management, between a threshold associated with default management and a threshold associated with delay, and below a threshold associated with delay.

When a priority value is above the threshold associated with default management, in some embodiments the memory system performs a full management operations. When a priority value is between the threshold associated with default management and the threshold associated with delay, the memory system performs a partial management operation. And when a priority value is below the threshold associated with delay, the memory system delays the management operation until the next subsequent mode (e.g., second mode).

The above discussion is meant to be illustrative of the principles and various embodiments described herein. Numerous variations and modifications will become apparent to those skilled in the art once the above disclosure is fully appreciated. For example, although a controller 104 has been described as performing the methods described above, any processor executing software within a host system can perform the methods described above without departing from the scope of this disclosure. In particular, the methods and techniques described herein as performed in the controller, may also be performed in a host. Furthermore, the methods and concepts disclosed herein may be applied to other types of persistent memories other than flash. It is intended that the following claims be interpreted to embrace all such variations and modifications.

What is claimed is:

1. A non-volatile storage system, configured to use a protocol that supports predictable latency, the non-volatile storage system comprising:
    a memory array storing data in a block of memory;
    a controller coupled to the memory array, wherein the controller is configured to:
        in response to determining that predictable latency is enabled, operate the non-volatile storage system using a first mode for a duration of time, wherein during the first mode, the non-volatile storage system operates such that a read latency is below a read latency threshold; and
        after the duration of time, operate the non-volatile storage system using a second mode for a second duration of time, wherein during the second mode:
            the non-volatile storage system performs a management operation based on a second set of thresholds that are different from a first set of thresholds used during the first mode;
    wherein when the non-volatile storage system operates in the second mode, the controller is further configured to:
        mark the block of memory as suspicious, based on a modified threshold, wherein the controller is further configured to:
        compare a bit error rate of a page of memory in the non-volatile storage system to the modified threshold, wherein the modified threshold is different from a threshold used during the first mode; and
        in response to determine the bit error rate is above the modified threshold, mark the block of memory including the page of memory as suspicious.

2. The non-volatile storage system of claim 1, wherein the controller is further configured to:
    determine a number of times the block of memory was marked suspicious is above a read scrub threshold; and
    perform a read scrub operation on the data in the block of memory,
    wherein:
        the read scrub threshold corresponds to the second mode; and the read scrub threshold is different from a second read scrub threshold associated with a different read scrub that corresponds to the first mode.

3. A non-volatile storage system, configured to use a protocol that supports predictable latency, the non-volatile storage system comprising:
  a memory array storing data in a block of memory;
  a controller coupled to the memory array, wherein the controller is configure to:
    in response to determining that predictable latency is enabled, operate the non-volatile storage system using a first mode for a duration of time, wherein during the first mode, the non-volatile storage system operates such that a read latency is below a read latency threshold; and
    after the duration of time, operate the non-volatile storage system using a second mode for a second duration of time, wherein during the second mode;
    the non-volatile storage system performs a management operation based on a second set of thresholds that are different from a first set of thresholds used during the first mode;
  wherein when the non-volatile storage system operates in the first mode, the controller is further configured to:
    receive an indication that performance of the management operation is planned;
    determine a severity level of the management operation;
    calculate a time remaining in the first mode; and
    determine a priority value based on the severity level and the time remaining in the first mode, wherein the priority value is associated with the management operation.

4. The non-volatile storage system of claim 3, wherein the controller is further configured to:
  during operation of the non-volatile storage system in the first mode, determine that the priority value is below a default management threshold;
  execute, during operation of the non-volatile storage system in the first mode, a portion of the management operation; and
  execute, during operation of the non-volatile storage system in the second mode, a remaining portion of the management operation.

5. The non-volatile storage system of claim 4, wherein the management operation is a garbage collection operation and wherein the controller is further configured to:
  during the first mode, perform a partial garbage collection operation; and
  during the second mode, perform another partial garbage collection operation.

6. A method for operating a memory system using a protocol that supports predictable latency, the method comprising:
  in response to determining that predictable latency is enabled, operating the memory system using a first mode for a duration of time, wherein during the first mode, the memory system operates such that a read latency is below a read latency threshold;
  after the duration of time, operating the memory system using a second mode for a second duration of time, wherein during the second mode: the memory system performs a management operation based on a management operation priority value; and
  determining, during the first mode, the management operation priority value by:
    receiving an indication that performance of the management operation is planned;
    determining a severity level of the management operation;
    calculating a time remaining in the first mode; and
    determining the management operation priority value based on the severity level and the time remaining.

7. The method of claim 6, further comprising:
  determining, during the first mode, that the management operation priority value is below a default management threshold;
  executing, during the first mode, a portion of the management operation; and
  executing, during the second mode, a remaining portion of the management operation.

8. The method of claim 7, wherein the management operation is a calibration of read thresholds and wherein the operating the memory system further comprises:
  during the first mode, performing the calibration of the read thresholds using a first algorithm; and then
  during the second mode, performing an additional calibration of the read thresholds using a second algorithm different from the first algorithm.

9. The method of claim 6, wherein the operating the memory system using the second mode further comprises:
  determining the priority value is above a default management threshold, wherein the management operation is calibrating a read threshold; and
  calibrating the read threshold using an algorithm used to perform a complete read threshold calibration.

10. The method of claim 7, wherein the management operation is a garbage collection operation and wherein the operating the memory system further comprises:
  during the first mode, performing a partial garbage collection operation; and
  during the second mode, performing another partial garbage collection operation.

11. The method of claim 6, further comprising:
  determining, during the second mode, that the priority value is below a default management threshold associated; then
  determining, during the second mode, that a block of memory is suspicious, by:
    comparing a bit error rate of a page of memory in the memory system to a modified threshold; in response to determining the bit error rate is above the modified threshold, wherein the modified threshold is different from a threshold used during the first mode,
    marking the block of memory including the page of memory as suspicious.

12. The method of claim 11, further comprising:
  determining a number of times the block of memory was marked suspicious is above a modified read scrub threshold; and
  performing a modified read scrub operation on a data in the block of memory,
  wherein:
    the modified read scrub threshold corresponds to the second mode, and
    the modified read scrub threshold is different from a second modified read scrub threshold associated with a different read scrub that corresponds to the first mode.

13. A memory controller, comprising:
a first terminal configured to couple to a memory array, the memory controller configured to:

in response to determining that predictable latency is enabled, operate the memory array using a first mode for a duration of time, wherein during the first mode, the memory array operates such that a read latency is below a read latency threshold;

after the duration of time, operate the memory array using a second mode for a second duration of time, wherein during the second mode, the controller performs a management operation based on a management operation priority value; and determine, during the first mode, the management operation priority value by being further configured to:

receive an indication that performance of the management operation is planned;

determine a severity level of the management operation;

calculate time remaining in the first mode; and determine the management operation priority value based on the severity level and the time remaining.

14. The memory controller of claim 13, further configured to:

determine, during the first mode, that the priority value is below a default management threshold;

execute, during the first mode, a portion of the management operation; and execute, during the second mode, a remaining portion of the management operation.

15. The memory controller of claim 14, wherein the management operation is a calibration of read thresholds and wherein the memory controller is further configured to:

during the first mode, perform the calibration of read thresholds using a first algorithm; and then during the second mode, perform an additional calibration of read thresholds using a second algorithm different from the first algorithm.

16. The memory controller of claim 14, wherein the management operation is a garbage collection operation and wherein the memory controller is further configured to:

during the first mode, perform a partial garbage collection operation; and during the second mode, perform another partial garbage collection operation.

17. A memory controller, comprising:

a first terminal configured to couple to a memory array, the memory controller configured to:

in response to determining that predictable latency is enabled, operate the memory array using a first mode for a duration of time, wherein during the first mode, the memory array operates such that a read latency is below a read latency threshold; and after the duration of time, operate the memory array using a second mode for a second duration of time, wherein during the second mode, the controller performs a management operation based on a management operation priority value;

determine, during the second mode, that the priority value is below a default management threshold; and then perform, during the second mode, a modified read scrub operation, wherein the memory controller is further configured to:

compare a bit error rate of a page of memory in the memory array to a modified management operation threshold; in response to determining the bit error rate is above the modified management operation threshold, mark a block of memory including the page of memory as suspicious;

determine a number of time the block of memory was marked suspicious is above a read scrub threshold; and perform a read scrub operation on a data in the block of memory, wherein:

the read scrub threshold corresponds to the second mode, and the read scrub threshold is different from a second read scrub threshold associated with a different read scrub that corresponds to the first mode.

* * * * *